Patented Oct. 30, 1945

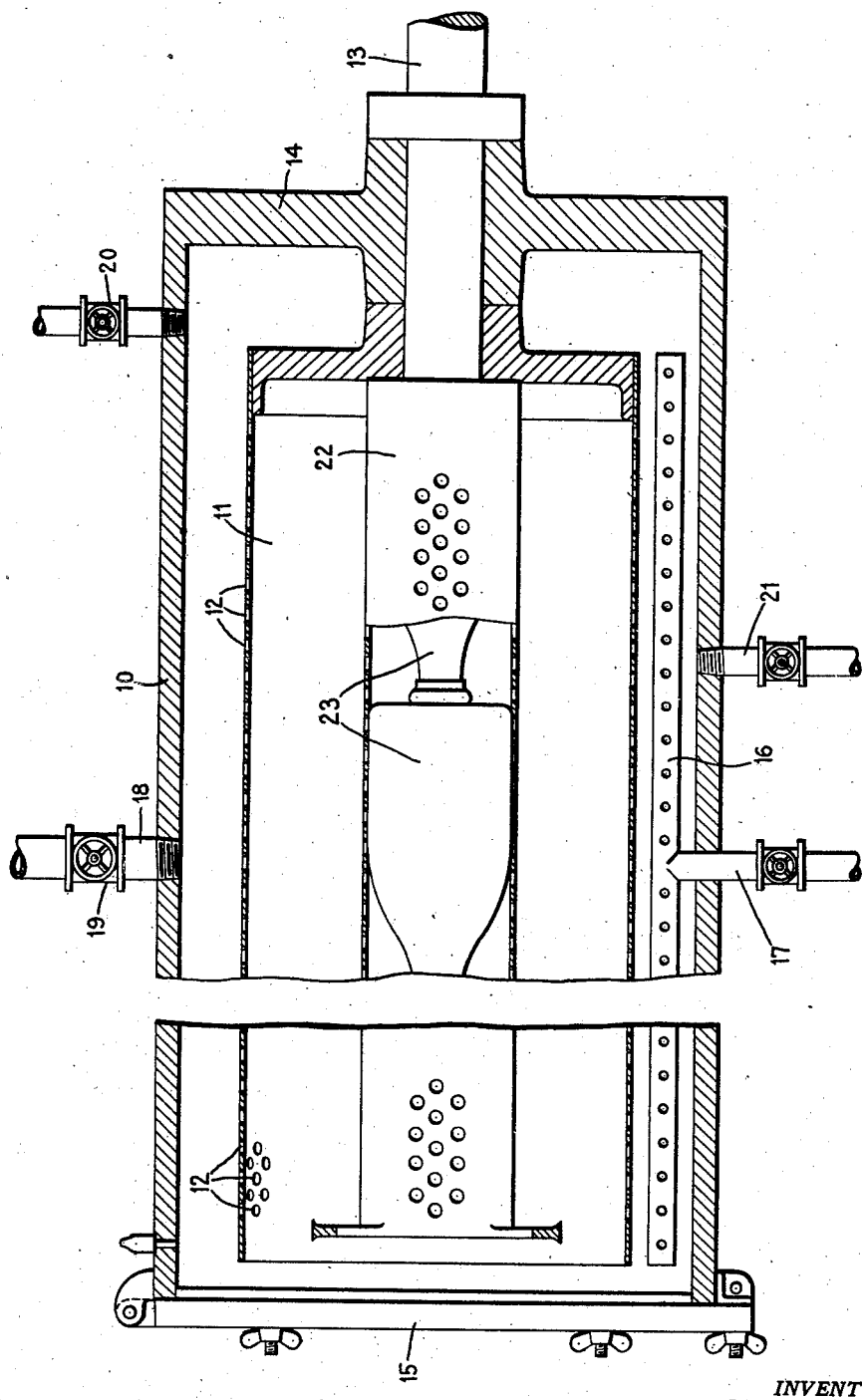

2,388,103

UNITED STATES PATENT OFFICE 2,388,103

STERILIZATION OF EVAPORATED MILK IN GLASS CONTAINERS

Randall Whitaker, Robert P. Myers, and Robert E. Homberger, Baltimore, Md., assignors to Sealtest, Inc., Baltimore, Md., a corporation of Maryland Application July 22, 1942, Serial No. 451,814

4 Claims. (Cl. 99—214)

This invention relates to improvements in the preparation of evaporated milk and relates more particularly to methods of sterilizing evaporated milk in glass containers.

The public has always been accustomed to purchasing evaporated milk in tinned cans. Although entirely harmless, the interiors of the cans are almost always discolored, when the milk is sterilized by conventional methods, due to a reaction between the tin coating and the solder in the can and the sulfides released from the milk during sterilization. This reaction between the milk and the metallic walls of the container also may produce undesirable flavor characteristics in the milk.

We have found that it is possible to sterilize evaporated milk in glass bottles and that, in spite of the lower rate of heat transfer in glass as compared with metallic containers, the milk can be heated to a higher temperature and in a shorter period of time by the use of suitable agitating and heating apparatus, than is possible in accordance with the present methods of sterilizing milk in tin cans. The combination of the use of glass bottles, together with the novel method of rapidly heating the milk to sterilizing temperature results in evaporated milk having superior flavor and appearance and, therefore, greater appeal to the consumer.

An object of this invention, therefore, is to provide a process of sterilizing evaporated milk in glass bottles.

Other objects of the invention will become apparent from the description hereinafter of typical methods embodying the present invention.

The milk may be concentrated or evaporated in accordance with any of the prior methods, but we prefer to concentrate or evaporate the milk in the manner disclosed in our copending application Serial No. 381,552, filed March 3, 1941, now Patent No. 2,372,239, dated March 27, 1945 for the reason that the product obtained thereby is superior in heat stability to evaporated milk produced by other methods.

In accordance with the disclosure of our Patent No. 2,372,239, the evaporated milk product is prepared by means of a closely related series of steps which include, generally, the forewarming of the milk at a comparatively low temperature (below 200° F.) preparatory to concentrating the milk so that the amount of protein which is coagulated is decreased. Under these conditions high viscosity will be obtained when the concentrated milk is subsequently subjected to the sterilizing operation.

After the milk has passed through the forewarming stage, it is drawn into a vacuum pan where moisture is evaporated from the milk. The evaporated milk is then withdrawn from the vacuum pan, delivered to a homogenizer, thence to a collector and then delivered to a bottle filler beneath which the bottles are conveyed. The evaporated milk may be heated prior to its introduction into the bottles or may be introduced thereinto at substantially room temperature or cold at a temperature between 35° and 45° F., as may be desired.

During all of the operations subsequent to evaporation of the milk, the milk is maintained in an atmosphere of inert gas or under vacuum in order to reduce the tendency of the flavor of the milk to be altered by oxidation.

When the sterilizing conditions are such that caramelization occurs in evaporated milk, certain compounds are formed which act as anti-oxidants preventing oxidation of susceptible constituents in the product during prolonged storage. At the same time, reactions occur which bring about the combination of oxygen with constituents of the milk, thereby rendering the product essentially free from oxygen.

When milk is sterilized in accordance with the present invention, caramelization and the reaction involving the formation of the anti-oxidants and the removal of oxygen do not take place and there develops in this product on prolonged storage a flavor best described as "oxidized" unless special precautions are taken to avoid it. These precautions are, as described above, the removal of substantially all of the oxygen from the bottle and the milk before sterilization.

The sterilization operation embodying the present invention consists generally in raising the temperature of the milk in the bottles in a very short period of time to a high sterilizing temperature and then as quickly as possible cooling the milk without holding it at the sterilizing temperature.

In order to accomplish the required rapid heating of the milk, the milk in the container must be agitated vigorously in such a manner that maximum heat transfer takes place.

The bottles are not completely filled, inasmuch as agitation during sterilization requires that a head space be left in the bottles to aid in agitation of the milk. This head space may be evacuated or may be filled with inert gas.

Although various methods of and apparatus for agitating the milk may be employed, the most desirable type of agitation may be provided by (1) rotation of the bottle about its geometric axis, or (2) about an axis parallel to but not coaxial with the geometric axis of the container. At lower speeds, the second-mentioned method is somewhat more efficient than the first. However, the second method is limited as to speed of rotation that can be employed without causing foaming and burning of the milk on the walls of the containers. As the speed of rotation is increased in the second method, a speed is reached where the centrifugal force becomes great enough to overcome the force of gravity and the liquid is thrown against the bottle, thereby forcing the bubble formed by the head space into the center of the bottle. This causes the milk to foam and also prevents free washing of the sides of the bottle with the milk. These difficulties are overcome at higher speeds by rotating the bottle about its own axis.

It has been found possible to destroy resistant bacterial spores that may be present in the milk by subjecting the bottled milk, under the conditions of agitation described, to temperatures of 280° F. to 300° F. for periods of 3 to 5 minutes, the final maximum temperature reached in the center of the bottle being in the range of 255° F. to 265° F. The more rapidly the temperature is raised to this critical sterilizing range and the faster the cooling, the less the flavor of the milk is affected.

The temperature of the milk, after sterilizing temperature has been attained, is reduced rapidly by subjecting the container to the action of a cooling liquid while maintaining the bottle under an increased pressure in order to prevent the bottle from rupturing or having its cap blown off. Preferably, the temperature of the cooling liquid is reduced in stages in order to avoid cracking of the bottles.

Milk processed as described above, possesses several characteristics which distinguish it from milk processed by conventional methods of sterilization in which the milk is heated at lower temperatures but for longer periods of time.

One of the most important characteristics of the milk produced in accordance with the present invention is the improved flavor. Because of the rapidity of heating, there is little, if any, of the caramelization which imparts the typical cooked milk flavor and the dark color to the products now on the market. Moreover, oxidation of the milk is avoided and the product therefore is entirely free of oxidized flavor.

For a better understanding of the present invention, reference may be had to the accompanying drawing in which the single figure is a view in longitudinal section of a typical form of device for sterilizing the evaporated milk.

As shown in the drawing, the apparatus for sterilizing the milk may consist of an autoclave or pressure chamber 10 in which is rotatably mounted a reel 11 having a multiplicity of perforations 12 therein. The reel is supported upon a shaft 13 which passes through the end wall 14 of the pressure chamber 10 and is driven by a motor, not shown. The chamber 10 has a door 15 at one end thereof by means of which it may be sealed to withstand substantial internal pressure.

In the bottom portion of the chamber 10 is located a manifold 16 to which steam is supplied by means of a pipe 17. Water and compressed air are supplied to the chamber 10 by means of a pipe 18 having a valve 19 therein. The chamber 10 also has a blowoff valve 20 and an outlet 21 for condensate.

In the center of the reel 11 is a compartment 22 in which the bottles 23 are received so that they may be rotated about their geometric axes. Bottles also may be disposed between the reel 11 and the compartment 22.

The reel is normally driven at about 50 to 200 revolutions per minute when the compartment 22 is being used, or between 25 and 75 revolutions per minute when the space between the reel 11 and the compartment 22 is used.

In operation, the bottles which have been filled with evaporated milk produced as disclosed in our application Serial No. 381,552 and sealed are placed in the center compartment 22 of the reel 11. The bottles are not completely filled with milk, but a head space is left which is evacuated and/or filled with an inert or non-oxidizing gas. Vacuum sealing is particularly satisfactory, and, because of the rigidity of the glass containers, can readily be used without causing the containers to collapse during sterilization. As above indicated, the bottles may be either steam or vapor sealed or may be sealed under reduced pressure. For example, 16 fluid ounces of evaporated milk, measured at 60° F., may be filled into a bottle having an overflow capacity of 17 fluid ounces.

When the bottles 23 are positioned in the reel 11, the door 15 is closed and the autoclave is sealed. Steam at a temperature between about 280° F. and 300° F. is introduced into the chamber while the bottles are rapidly rotated in the reel 11. By using steam at this temperature, the temperature of the milk, measured at the center of a bottle holding 16 fluid ounces, is raised to between 255° and 265° F. in a period of not over five minutes with the reel 11 rotating at a speed of 50 R. P. M. If the milk is preheated to a temperature of about 130° F., before introduction into the reel 11 and the rotation of reel 11 be increased to 150 R. P. M., the temperature of milk may be raised to between 255° and 265° F. in about 3 minutes.

Upon attaining the desired sterilization temperatures, the milk in the bottles may be rapidly cooled by shutting off the steam and introducing a cooling liquid and compressed air into the autoclave. Introduction of air under pressure is essential in order to prevent the bottles from bursting or having their seals blown out.

When using ordinary glass bottles, it is usually necessary to reduce the temperature of the bottles in stages so as to prevent cracking of the containers. A suitable cycle is as follows: A cooling medium at a temperature of about 145° F. is introduced into the autoclave and allowed to remain there for about 1½ minutes. A secondary cooling medium at a temperature of about 110° F. is introduced into the autoclave and is allowed to remain in the autoclave for about one minute. Then a cooling medium at 60° F. is introduced and allowed to remain in the autoclave for a period of about 4 minutes. In this way, the temperature differential between the sterilized milk and the cooling medium is maintained sufficiently small to prevent cracking of the container.

When heat resistant glass bottles are used, the milk may be cooled by introducing warm water (about 100° F.) into the autoclave, followed by cold water or even refrigeration.

The extremely short period of heating, even at the high temperature indicated, prevents caramelization or cooking of the milk and thus undesirable flavoring of the milk is avoided.

The above-described operation produces a milk product which has many novel characteristics, namely, a fresh milk flavor, a white or creamy color, a high viscosity and other characteristics similar to fresh milk, such as the ability to be coagulated with rennet and whipped like cream, if subjected to a heating and chilling before whipping. Moreover, the product is contained in glass which is a most desirable type of container for milk, allowing the customer to view the product.

It has been found desirable to store the finished product at a temperature between 50° and 33° F. in order to minimize the formation of undesirable flavors therein, if the bottles of sterilized milk are to be stored for relatively long periods of time. If the milk is to be used within a short period of time, approximately one month, it is unnecessary to store it at low temperatures, inasmuch as it has been found that undesirable flavors do not develop in this short period of time.

From the foregoing description of a typical process embodying the invention and the resulting product, it will be apparent that milk products made in accordance with the present invention may be readily distinguished from prior products because of the above-noted novel and highly desirable characteristics.

It will be understood, of course, that the apparatus used in practicing the process may be varied considerably without departing from the invention. Accordingly, it should be understood that the above-described example is illustrative only and should not be considered as limiting the scope of the following claims.

We claim:

1. A method of sterilizing evaporated milk in a glass bottle, which comprises preheating evaporated milk to about 130° F., rotating a bottle containing said preheated milk in a horizontal position while heating and maintaining under superatmospheric pressure the bottle to raise the temperature of the milk to between about 255° and 265° F. in a period not exceeding five minutes, and immediately cooling said bottle in stages by contacting it with fluids of progressively decreasing temperatures, the difference in temperatures of said fluids used in cooling being insufficient to cause cracking of said bottles.

2. A method of sterilizing evaporated milk in a glass bottle, which comprises partially filling a glass bottle with evaporated milk, sealing the bottle, rotating said bottle in a horizontal position while contacting it with a fluid under superatmospheric pressure at a temperature sufficiently high to raise the temperature of the milk to between about 255° and 265° F. in a period not exceeding five minutes, and then rapidly cooling said bottle under superatmospheric pressure by contacting said bottle with (1) a first fluid having a temperature less than the temperature of said milk and sufficiently high to prevent cracking of the bottle and (2) a second fluid cooler than said first fluid.

3. A method of sterilizing evaporated milk in a glass bottle which comprises filling a glass bottle partially with evaporated milk, rotating said bottle in a horizontal position and about its geometric axis at about 50 to 200 revolutions per minute, contacting the bottle while rotating with a fluid under pressure at a temperature between about 280° and 300° F. to raise the temperature of the milk to between about 255° and 265° F. in a period not exceeding about five minutes, and immediately rapidly cooling said bottle in a plurality of decreasing temperature stages under superatmospheric pressure.

4. A method of sterilizing evaporated milk in a glass bottle, which comprises heating evaporated milk to a temperature of about 130° F., rotating a bottle containing the heated milk at a speed of 150 to 200 R. P. M. in a horizontal position while heating the bottle and maintaining it under superatmospheric pressure to raise the temperature of the milk to between about 255° and 265° F. in a period not exceeding three minutes, and immediately contacting said bottle with a cooling fluid at a temperature sufficiently high to avoid cracking said bottle and at superatmospheric pressure to reduce the temperature of said milk and thereafter cooling said milk to a lower temperature.

RANDALL WHITAKER.
ROBERT P. MYERS.
ROBERT E. HOMBERGER.